United States Patent [19]

Claussen et al.

[11] Patent Number: 4,544,496

[45] Date of Patent: Oct. 1, 1985

[54] LIGHT-COLLECTING SYSTEM USING COUMARIN DERIVATIVES AS ENERGY CONVERTERS

[75] Inventors: Uwe Claussen, Leverkusen; Horst Harnisch, Much, both of Fed. Rep. of Germany

[73] Assignee: Bayer Aktiengesellschaft, Leverkusen, Fed. Rep. of Germany

[21] Appl. No.: 500,795

[22] Filed: Jun. 6, 1983

Related U.S. Application Data

[63] Continuation of Ser. No. 406,622, Aug. 9, 1982, abandoned, which is a continuation of Ser. No. 176,383, Aug. 8, 1980, abandoned.

[30] Foreign Application Priority Data

Aug. 27, 1979 [DE] Fed. Rep. of Germany ....... 2934541
Dec. 22, 1979 [DE] Fed. Rep. of Germany ....... 2952228

[51] Int. Cl.$^4$ .............................. C09K 11/02
[52] U.S. Cl. ..................... 252/301.35; 250/227; 250/301.16; 250/301.17; 250/301.22; 250/301.34; 549/288; 136/247
[58] Field of Search ............ 252/301.16, 301.17, 252/301.34, 301.35, 301.32; 136/247, 89 FC, 89 CA, 89 CL, 89 PC, 89 HY; 549/288; 250/227

[56] References Cited

U.S. PATENT DOCUMENTS 3,666,680  5/1972  Briggs ................................. 252/316
4,127,425 11/1978  Chambers ....................... 136/89 PC
4,190,465  2/1980  Boling ............................ 136/89 FC

FOREIGN PATENT DOCUMENTS 2844299  4/1979  Fed. Rep. of Germany .

OTHER PUBLICATIONS

Sanders, "Pigment Compositions", Official Gazette, application Ser. No. 791,145, 4/21/53.
In Re Harnish, 200 USPQ 300.

Primary Examiner—Arthur P. Demers
Attorney, Agent, or Firm—Sprung Horn Kramer & Woods

[57] ABSTRACT

A light-collecting system, characterized in that it contains a coumarin derivative of the formula

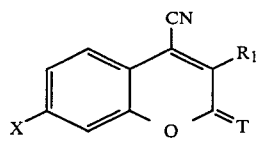

in which
T denotes O or $NR_4$, in which
$R_4$ represents hydrogen, optionally substituted aryl, optionally substituted cycloalkyl or optionally substituted aralkyl,
$R_1$ denotes a carbocyclic or heterocyclic 5-membered or 6-membered ring bonded via a C atom, or a 5-membered or 6-membered heterocyclic ring which is bonded via a N atom and is rotationally asymmetrical to an axis placed through the coumarin/N-heterocyclic bond, it being possible for the said 5-membered or 6-membered rings to carry non-ionic substituents and for an optionally substituted benzene ring or an optionally substituted naphthalene ring to be fused to the said rings;
X signifies

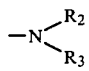

or $-OR_2'$, in which
$R_2$ represents hydrogen, alkyl, cycloalkyl, aralkyl or aryl, it being possible for the said hydrocarbon radicals to be substituted, and $R_3$, in addition to having the definitions given for $R_2$, also signifies a radical of the formulae

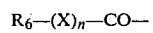

or

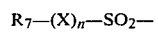

in which
$R_6$ and $R_7$ represent alkyl, cycloalkyl, aryl or aralkyl, it being possible for the said hydrocarbon radicals to be substituted,
X represents NH or O and
n represents 0 or 1, or
$R_2$ and $R_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto, or
$R_2$ and $R_3$ together form a di-unsaturated radical of the formula

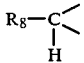

in which
$R_8$ represents optionally substituted alkyl, optionally substituted aryl, optionally substituted cycloalkyl or optionally substituted aralkyl, and
$R_2'$ signifies optionally substituted alkyl, alkenyl, optionally substituted cycloalkyl, optionally substituted aryl or optionally substituted aralkyl, and the use of coumarin derivatives in light-collecting systems.

12 Claims, No Drawings

LIGHT-COLLECTING SYSTEM USING COUMARIN DERIVATIVES AS ENERGY CONVERTERS

This application is a continuation of application Ser. No. 406,622 filed Aug. 9, 1982, now abandoned which in turn is a continuation of Ser. No. 176,383 filed Aug. 8, 1980, now abandoned, said Ser. No. 176,383 being copending with and bringing forward disclosure from Ser. No. 158,029 filed June 9, 1980 of Horst Harnisch; now abandoned.

BACKGROUND OF THE INVENTION

Devices for collecting diffuse electromagnetic radiation by the utilization of fluorescence have been disclosed. The core piece of the collector is a medium which has a higher optical density than the surroundings and which contains centres capable of fluorescence (DE-OS (German Published Specification) No. 2,620,115).

The economic practicability of a light-collecting system is to a large extent determined by the suitability of the dyestuff employed therein as a light converter. Extreme demands are made with regard to the optical quality of this dyestuff [Appl. Phys. 14 123–139 (1977)].

SUMMARY OF THE INVENTION

The invention relates to new light-collecting systems, which are characterized in that they contain, as the energy converter, a coumarin derivative of the formula

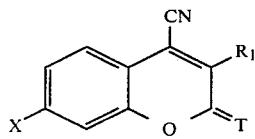

(I)

In formula (I):

T denotes O or $NR_4$, in which $R_4$ represents hydrogen, optionally substituted aryl, optionally substituted cycloalkyl or optionally substituted aralkyl, $R_1$ denotes a carbocyclic or heterocyclic 5-membered or 6-membered ring bonded via a C atom, or a 5-membered or 6-membered heterocyclic ring which is bonded via a N atom and is rotationally asymmetrical to an axis placed through the coumarin/N-heterocyclic bond, it being possible for the said 5-membered or 6-membered rings to carry non-ionic substituents and for an optionally substituted benzene ring or an optionally substituted naphthalene ring to be fused to the said rings;

X signifies

or $-OR_2'$, in which $R_2$ represents hydrogen, alkyl, cycloalkyl, aralkyl or aryl, it being possible for the said hydrocarbon radicals to be substituted, and $R_3$, in addition to having the definitions given for $R_2$, also signifies a radical of the formulae

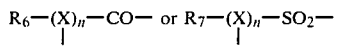

in which $R_6$ and $R_7$ represent alkyl, cycloalkyl, aryl or aralkyl, it being possible for the said hydrocarbon radicals to be substituted, X represents NH or O and n represents 0 or 1, or $R_2$ and $R_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto, or $R_2$ and $R_3$ together form a di-unsaturated radical of the formula

in which $R_8$ represents optionally substituted alkyl, optionally substituted aryl, optionally substituted cycloalkyl and/or optionally substituted aralkyl, and $R_2'$ signifies optionally substituted alkyl, alkenyl, optionally substituted cycloalkyl, optionally substituted aryl or optionally substituted aralkyl.

$R_1$ preferably represents a 5-membered or 6-membered heterocyclic ring which contains 1, 2 or 3 hetero-atoms from the series comprising N, O and S and to which a benzene ring can be fused, it being possible for both the heterocyclic ring and the fused benzene ring to be substituted by, for example, alkyl, aryl, aralkyl, cycloalkyl, halogen, alkoxy, cyano and acyl.

Examples which may be mentioned of $R_1$ as a 5-membered or 6-membered heterocyclic ring to which a benzene ring can be fused are: pyrazole, imidazole, thiazole, oxazole, 1,2,4-triazole, 1,3,4-oxadiazole, 1,3,4-thiadiazole, benzimidazole, benzthiazole, benzoxazole and pyridine.

Particularly preferentially, $R_1$ represents a heterocyclic radical of the formula

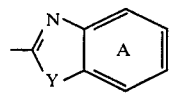

in which

Y signifies O, $NR_5$ or S and $R_5$ represents hydrogen, alkyl, aryl, cycloalkyl or aralkyl, it being possible for the said hydrocarbon radicals to be substituted, and the ring A can be substituted by alkyl, sulphoalkyl, aryl, aralkyl, cycloalkyl, alkoxy, acyl, halogen, sulphamoyl and cyano.

In one embodiment of the invention, the ring A is substituted by, preferably, 1 to 2 substituents from the group comprising $C_1$-$C_4$-alkyl, $C_1$-$C_4$-alkoxy, bromine, chlorine, phenyl, cyclohexyl, $C_1$-$C_4$-alkylsulphonyl, sulphamoyl or $C_1$-$C_4$-alkoxycarbonyl.

R$_2$ and R$_3$ together with the N atom and optionally with the inclusion of further hetero-atoms preferably form a 5-membered or 6-membered ring which can contain 1 or 2 further hetero-atoms from the group comprising N, O and S and to which a benzene ring can be fused, it being possible for the heterocyclic radical to be substituted both in the heterocyclic part and also in the fused benzene ring by, for example, alkyl, aryl, aralkyl, cycloalkyl, halogen, alkoxy, cyano and acyl.

Alkyl (as R$_2$, R$_2'$, R$_3$, R$_4$, R$_5$, R$_6$, R$_7$ or R$_8$, as a substituent of ring A and also as a non-ionic substituent of the 5-membered or 6-membered rings R$_1$ or of the 5-membered or 6-membered rings formed by R$_2$ and R$_3$ together with the N atom, and of the fused rings) preferably represents C$_1$-C$_6$-alkyl.

Alkenyl (R$_2'$) preferably represents allyl.

Aryl (as R$_2$, R$_2'$, R$_3$, R$_4$, R$_5$, R$_6$, R$_7$ or R$_8$, as a substituent of ring A and also as a non-ionic substituent of the 5-membered or 6-membered rings R$_1$ or of the 5-membered or 6-membered rings formed by R$_2$ and R$_3$ together with the N atom, and of the fused rings) preferably represents phenyl.

Aralkyl (as R$_2$, R$_2'$, R$_3$, R$_4$, R$_5$, R$_6$, R$_7$ or R$_8$, as a substituent of ring A and also as a non-ionic substituent of the 5-membered or 6-membered rings R$_1$ or of the 5-membered or 6-membered rings formed by R$_2$ and R$_3$ together with the N atom, and of the fused rings) preferably represents benzyl or phenethyl.

Cycloalkyl (as R$_2$, R$_2'$, R$_3$, R$_4$, R$_5$, R$_6$, R$_7$ or R$_8$, as a substituent of ring A and also as a non-ionic substituent of the 5-membered or 6-membered rings R$_1$ or of the 5-membered or 6-membered rings formed by R$_2$ and R$_3$ together with the N atom, and of the fused rings) preferably represents cyclohexyl.

Acyl (as a substituent of ring A and also as a non-ionic substituent of the 5-membered or 6-membered rings R$_1$ or of the 5-membered or 6-membered rings formed by R$_2$ and R$_3$ together with the N atom, and of the fused rings) preferably represents (C$_1$-C$_6$-alkyl)-carbonyl, benzoyl, C$_1$-C$_6$-alkylsulphonyl or phenylsulphonyl.

Halogen (as a substituent of ring A and also as a non-ionic substituent of the 5-membered or 6-membered rings R$_1$ or of the 5-membered or 6-membered rings formed by R$_2$ and R$_3$ together with the N atom, and of the fused rings) preferably represents chlorine, bromine or fluorine.

Alkoxy (as a substituent of ring A and also as a non-ionic substituent of the 5-membered or 6-membered rings R$_1$ or of the 5-membered or 6-membered rings formed by R$_2$ and R$_3$ together with the N atom, and of the fuxed rings) preferably represents C$_1$-C$_6$-alkoxy.

Substituted alkyl (as R$_2$, R$_2'$, R$_3$, R$_4$, R$_5$, R$_6$, R$_7$ or R$_8$) represents alkyl which can be substituted, for example, by halogen, such as chlorine and bromine, hydroxyl, cyano, trifluoromethyl, C$_1$-C$_6$-alkoxy, C$_1$-C$_6$-alkylsulphonyl, phenylsulphonyl, carbamoyl monosubstituted or disubstituted by C$_1$-C$_6$-alkyl or phenyl, carbamoyl, sulphamoyl, sulphamoyl monosubstituted or disubstituted by C$_1$-C$_6$-alkyl or phenyl, and amino monosubstituted or disubstituted by C$_1$-C$_6$-alkyl or phenyl.

Substituted aryl (as R$_2$, R$_2'$, R$_3$, R$_4$, R$_5$, R$_6$, R$_7$ or R$_8$), substituted cycloalkyl (as R$_2$, R$_2'$, R$_3$, R$_4$, R$_5$, R$_6$, R$_7$ or R$_8$) and substituted aralkyl (as R$_2$, R$_2'$, R$_3$, R$_4$, R$_5$, R$_6$, R$_7$ and R$_8$) represent aryl, cycloalkyl or aralkyl which can be substituted not only by the substituents mentioned above for alkyl but, for example, also by C$_1$-C$_6$-alkyl.

R$_2'$ preferably denotes C$_1$-C$_5$-alkyl, which is optionally substituted by acetoxy, C$_1$-C$_4$-alkoxy, phenoxy, cyclohexyloxy, phenyl-C$_1$-C$_2$-alkoxy, bromine or chlorine, or allyl, cyclohexyl or phenyl-C$_1$-C$_2$-alkyl.

Further dyestuffs which can preferentially be used as light converters are:

(a) Coumarin derivatives of the formula (I) in which R$_2$ and R$_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto, and (b) Dyestuffs of the formula

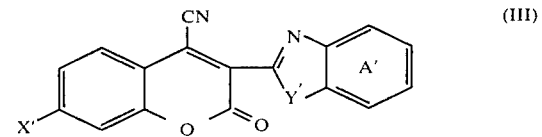

(III)

in which
X' signifies

or —O—R$_2'''$, in which

R$_2''$ represents hydrogen or C$_1$-C$_4$-alkyl, especially methyl and ethyl,

R$_3'$ represents C$_1$-C$_4$-alkyl, especially methyl and ethyl, C$_1$-C$_4$-alkylsulphonyl or phenylsulphonyl and R$_2'''$ represents C$_1$-C$_4$-alkyl, especially methyl and ethyl;

Y' signifies O, NR$_5'$ or S and

R$_5'$ signifies C$_1$-C$_4$-alkyl, especially methyl, or phenyl, and in which the ring A' can be substituted by C$_1$-C$_4$-alkyl, especially methyl, C$_1$-C$_4$-alkoxy, especially methoxy, halogen, especially chlorine, C$_1$-C$_4$-alkylsulphonyl, especially methylsulphonyl, or sulphamoyl.

DETAILED DESCRIPTION OF THE INVENTION

The compounds of the formula (I) which can be used according to the invention as energy converters in light-collecting systems are known (see, for example, German Offenlegungsschrift (German Published Specification) No. 2,844,299) or can be prepared by processes analogous to those disclosed in the literature.

A new process for the preparation of dyestuffs of the formula (I) in which X represents —OR$_2'$ is characterized in that compounds of the formula

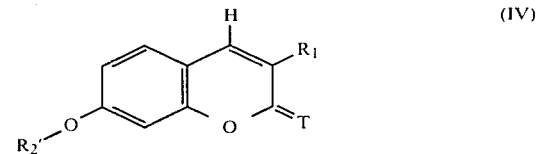

(IV)

in which
R$_1$, R$_2'$ and T possess the abovementioned meaning, are reacted in a polar organic solvent in a manner which is in itself known (compare DE-OS (German Published Specification) No. 2,844,299) with cyanide salts and, at the same time or subsequently, are treated with oxidising agents.

Suitable polar organic solvents are alcohols, such as methanol, ethanol, isopropanol, 2-methoxyethanol, 2-ethoxy-ethanol, ethylene glycol and 2-cyanoethanol, but especially dipolar aprotic organic solvents, such as dimethylformamide and also pyridine and picolines.

Intermediate isolation of the cyanide adduct is not necessary.

Suitable oxidizing agents are, for example, atmospheric oxygen, hydrogen peroxide, persulphates, perborates, nitric acid, bromine, sulphuryl chloride, lead tetraacetate and chloranil.

The cyanide salts used are advantageously water-soluble cyanides, especially alkali metal cyanides.

The reaction of the cyanide salts is carried out in the temperature range of 0° to 120° C., preferably at 10° to 60° C., and the oxidation is carried out in the range from $-5°$ to 30° C., preferably at 0° to 15° C.

The starting dyestuffs of the formula (IV) are known or can be prepared by known processes.

Relevant patent publications are, for example, U.S. Pat. Nos. 3,014,041, 3,288,801, 3,496,188, 3,816,413, 3,839,333, 3,669,621, 3,704,302, 3,839,351, 3,776,905, 3,968,119 and 4,055,568 and British Pat. Nos. 1,269,004, 1,313,253 and 1,318,975.

The new light-collecting systems, which are shaped bodies of suitable geometry, that is to say optical systems, in which the ratio of the emission surface to the absorption surface can be 1:50 to 1:2,000, are suitable for absorbing incident diffuse electromagnetic radiation and emitting it virtually without loss in a medium which has a higher optical density than the surroundings, as a result of which the bulk of the emitted light remains totally reflected in the medium.

Only that part of the emitted light for which the emission band is substantially free from absorption is usable for the purpose according to the invention.

Therefore, it is appropriate to subject the dyestuffs of the formula (I) to special purification before they are used in the light-collecting systems. In particular, they must be substantially free from impurities which absorb in the long-wave region.

According, the invention preferentially relates to light-collecting systems which are characterized in that they contain a dyestuff of the formula (I), which, in a 0.05% strength solution, for example in chloroform, measured in a layer thickness of 10 cm, displays an increase in the transmission from 0% to >90% for a change in the wavelength of 25-100 nm and preferably of 25-45 nm.

In advantageous cases, the dyestuffs can be purified by repeated careful crystallization.

Usually, separation by column chromatography on solid carriers such as $Al_2O_3$ or $SiO_2$ is necessary. High degrees of purity are obtained under particularly mild conditions by partition chromatography, for example by steady state (O'Keefe) partition or Craig countercurrent distribution.

The new light-collecting systems can be used, for example, in combination with solar cells for the utilization of solar energy and in scintillators of known types [see, for example, J. B. Birks: The Theory and Practice of Scintillation Counting (Pergamon Press, London 1964); J. Opt. Am. 39, 912 (1949); J. Appl. Phys. 40, 3544 (1969); Nuclear Instruments a. Methods 87, 111-123 (1970) Research Disclosure, page 43 (1977); and DE-OS (German Published Specification) No. 2,629,641)]. In addition, they are suitable, in combination with electronic controls, as display devices with very low energy consumption, and they are also suitable without electronic components for very diverse display, indication and marking purposes, for example in passive display elements, indicators and traffic signs, such as traffic lights.

The light-collecting systems according to the invention contain the dyestuff dissolved in a liquid or a solid and, depending on the field of application of the light-collecting system, very diverse geometric shapes are possible. Suitable solid media, such as are used, for example, for collecting light in combination with solar cells and in passive display elements, are, for example, plastics which transmit light and can be used optically, such as homopolymers and copolymers of acrylic acid (derivatives) or polycarbonates. Furthermore, the light-collecting systems can also contain the dyestuff dissolved in a liquid—for example an alcohol, ketone, halogenated hydrocarbon or ether. Very suitable solvents are, for example, ethanol, propanol, methyl ethyl ketone, acetone, cyclohexanone, chloroform, perchloroethylene and glycol monomethyl ether.

The use of the dyestuffs of the formula (I) in solids is preferred.

The use, according to the invention, of the dyestuffs of the formula (I) is highly advantageous since, in addition to a good quantum yield and a high intensification factor, they display excellent fastness to light and thus ensure that the new light-collecting systems can be used economically.

A particular characteristic is the very large Stokes shift, even with long-wave absorption, coupled with very good fastness to light.

It must be regarded as surprising that the dyestuffs of the formula (I) are suitable for advantageous use in light-collecting systems, since numerous highly fluorescent dyestuffs, such as, for example, rhodamine G, cannot be used. Likewise, the already very extensive demands which are made in respect of the optical quality of laser dyestuffs are in many cases not sufficient to enable the use of these dyestuffs in light-collecting systems to be recommended.

EXAMPLE 1

4 g of 3-(6-methyl-benzoxazolyl)-4-cyano-7-diethylamino-coumarin are dissolved in 60 ml of chloroform and the solution is subjected to chromatography on 800 g of silica gel (Merck). The eluant is 3:1 ethyl acetate/methanol. 3.2 g of product are obtained and this is recrystallized from n-butanol. Melting point: 213° C.

500 mg of the compound are dissolved in 1 l of chloroform and the transmission T is measured in a layer thickness of 10 cm. The transmission is 0% at 595 nm and 94% at 625 nm. The fluorescence quantum yield $\Phi$ is 0.70, the Stokes shift $\Delta$ is 69 nm and the proportion of usable fluorescence is 65%. The "proportion of usable fluorescence" is understood as meaning the percentage of the fluorescent light originally emitted which is not lost by reabsorption.

Analogously to Example 1, the values indicated are obtained for the compounds listed in the table which follows.

| Example No. | R₂ | R₃ | R₁ | Φ Fl | Δ [nm] | T [%] | Proportion of usable fluorescence [%] | Melting point |
|---|---|---|---|---|---|---|---|---|
| 2 | $C_2H_5$ | $C_2H_5$ | 2-methylbenzothiazole | 0.81 | 52 | 92 | 57 | 254° |
| 3 | $C_2H_5$ | $C_2H_5$ | 2-methyl-6-methoxybenzothiazole | 0.51 | 79 | 85 | 72 | 279° |
| 4 | $C_2H_5$ | $C_2H_5$ | 2-methylbenzoxazole | 0.61 | 51 | 92 | 64 | 292° |
| 5 | $C_2H_5$ | $C_2H_5$ | 2-methyl-chlorobenzoxazole | 0.78 | 68 | 92 | 61 | 259° |
| 6 |  |  | 2-methyl-methylbenzoxazole | 0.95 | 100 | 82 | 80 | 265° |
| 7 | 4-phenyl-imidazoline |  | 2-methylbenzothiazole | 0.52 | 88 | 94 | 69 | 258° |
| 8 | 4-methyl-imidazoline |  | 2-methyl-chlorobenzoxazole | 0.97 | 102 | 94 | 79 | 233° |
| RHODAMINE B |  |  |  | 0.61 | 20 | 98 | 24 |  |

Analogously to Example 1, the following compounds are also suitable for use in light-collecting systems:

| R₃ | R₂ | R₁ |
|---|---|---|
| n-$C_4H_9$ | —n-$C_4H_9$ | 2-methylbenzothiazole |

-continued

| R₃ | R₂ | R₁ |
|---|---|---|
| benzyl (PhCH₂–) | benzyl (PhCH₂–) | 2-benzothiazolyl |
| C₂H₅– | C₂H₅– | 6-ethoxy-2-benzothiazolyl |
| phenyl-SO₂– | H | 6-ethoxy-2-benzothiazolyl |
| phenyl-SO₂– | H | 5-(SO₂CH₃)-2-benzothiazolyl |
| phenyl-SO₂– | H | 2-benzoxazolyl |
| phenyl-SO₂– | H | 5-chloro-2-benzoxazolyl |
| phenyl-SO₂– | H | 5-methyl-2-benzoxazolyl |
| phenyl-SO₂– | H | 2-benzothiazolyl |
| phenyl-SO₂– | H | 1-methyl-2-benzimidazolyl |
| 4-CH₃-phenyl-SO₂– | H | 2-benzothiazolyl |
| 3,4-diCl-phenyl-SO₂– | H | 6-methoxy-2-benzothiazolyl |

-continued

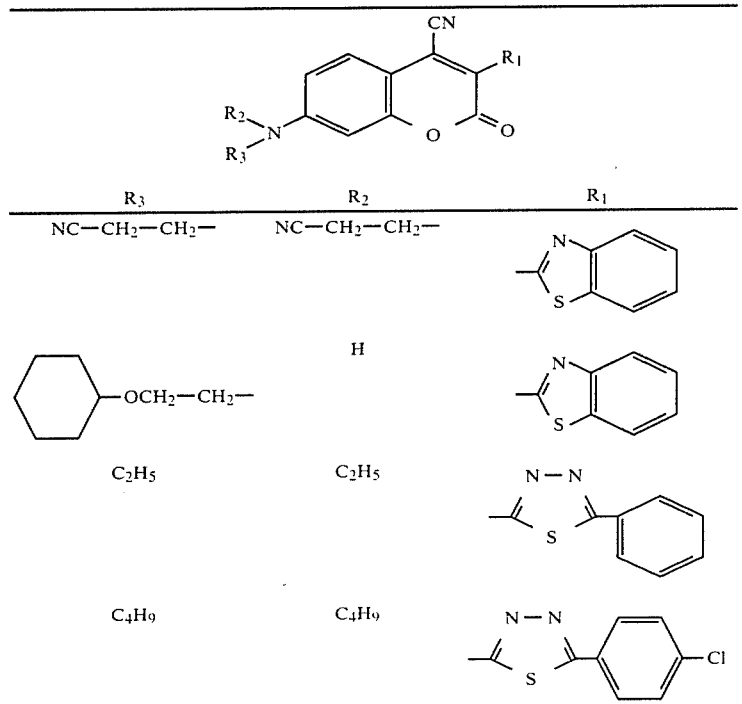

| R₃ | R₂ | R₁ |
|---|---|---|
| NC—CH₂—CH₂— | NC—CH₂—CH₂— | 2-benzothiazolyl |
| cyclohexyl-OCH₂—CH₂— | H | 2-benzothiazolyl |
| C₂H₅ | C₂H₅ | 5-phenyl-1,3,4-thiadiazol-2-yl |
| C₄H₉ | C₄H₉ | 5-(4-chlorophenyl)-1,3,4-thiadiazol-2-yl |

EXAMPLE 9

19.2 g of 6-methoxy-3-(benzthiazol-2-yl)-4-cyano-7-ethoxy-coumarin are dissolved in 1,200 ml of dichlorobenzene, and 0.5 g of tonsil is added. The mixture is filtered hot and, after cooling, 15.1 g of crystals are obtained. This crystallization is repeated twice, the Tonsil being omitted in the last crystallization. The yellow crystals have a melting point of 302° C.

488 mg of the compound thus obtained are dissolved in 1 l of chloroform and the transmission T is measured in a layer thickness of 10 cm. The transmission is 0% at 550 nm and 92% at 580 nm. The fluorescence quantum yield Φ is 1.00, the Stokes shift Δ is 135 nm and the proportion of usable fluorescence is 88%. The "proportion of usable fluorescence" is understood as meaning the percentage of the fluorescent light originally emitted which is not lost by reabsorption.

Analogously to Example 9, the values indicated are obtained for the compounds listed in the table which follows.

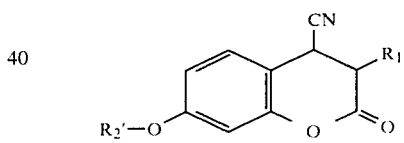

| R₂' | R₁ | Φ [%] | Stokes [nm] | T % | Usable fluorescence % | Melting point °C. | Example No. |
|---|---|---|---|---|---|---|---|
| CH₃— | 2-benzothiazolyl | 0.63 | 92 | 96 | 76 | 276 | 10 |
| C₂H₅— | 2-benzothiazolyl | 0.48 | 93 | 95 | 67 | 215 | 11 |
| CH₃— | 2-(6-sulfamoyl)benzoxazolyl | 0.75 | 119 | 90 | 82 | 287 | 12 |
| CH₃— | 2-(6-ethylsulfonyl)benzoxazolyl | 0.87 | 100 | 90 | 65 | 212 | 13 |

-continued
| R₂' | R₁ | Φ [%] | Stokes [nm] | T % | Usable fluorescence % | Melting point °C. | Example No. |
|---|---|---|---|---|---|---|---|
| CH₃— | 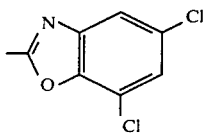 | 0.86 | 99 | 92 | 73 | 254 | 14 |
| CH₃— | 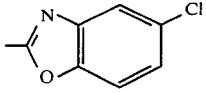 | 1.0 | 100 | 95 | 84 | 252 | 15 |
| CH₃— | 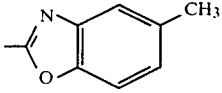 | 0.71 | 114 | 94 | 87 | 230 | 16 |
| CH₃— | 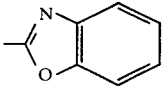 | 0.75 | 119 | 95 | 85 | 244 | 17 |
| C₂—H₅— | 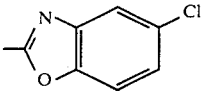 | 0.79 | 100 | 97 | 72 | 217 | 18 |
| C₂—H₅— | 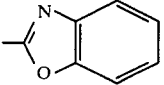 | 0.89 | 100 | 95 | 83 | 211 | 19 |
| CH₃— | 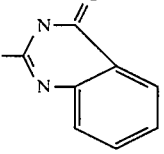 | 0.88 | 84 | 93 | 77 | 309 | 20 |
Analogously to Example 9, the following compounds are also suitable for use in light-collecting systems:
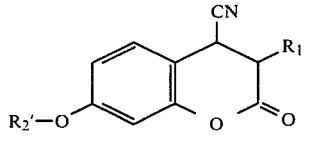
| R₂' | R₁ |
|---|---|
| n-C₄H₉ | 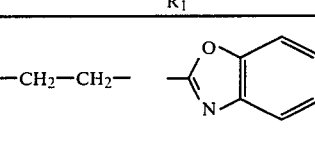 |
| 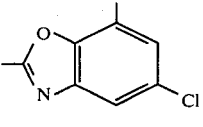 | 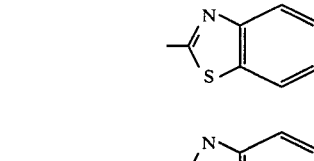 |
| cyclohexyl-O—CH₂—CH₂— | 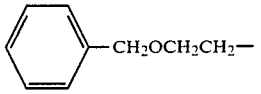 |
| C₂H₅ | 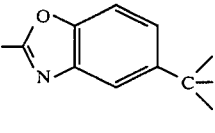 |
| phenyl-CH₂— | 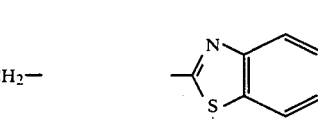 |

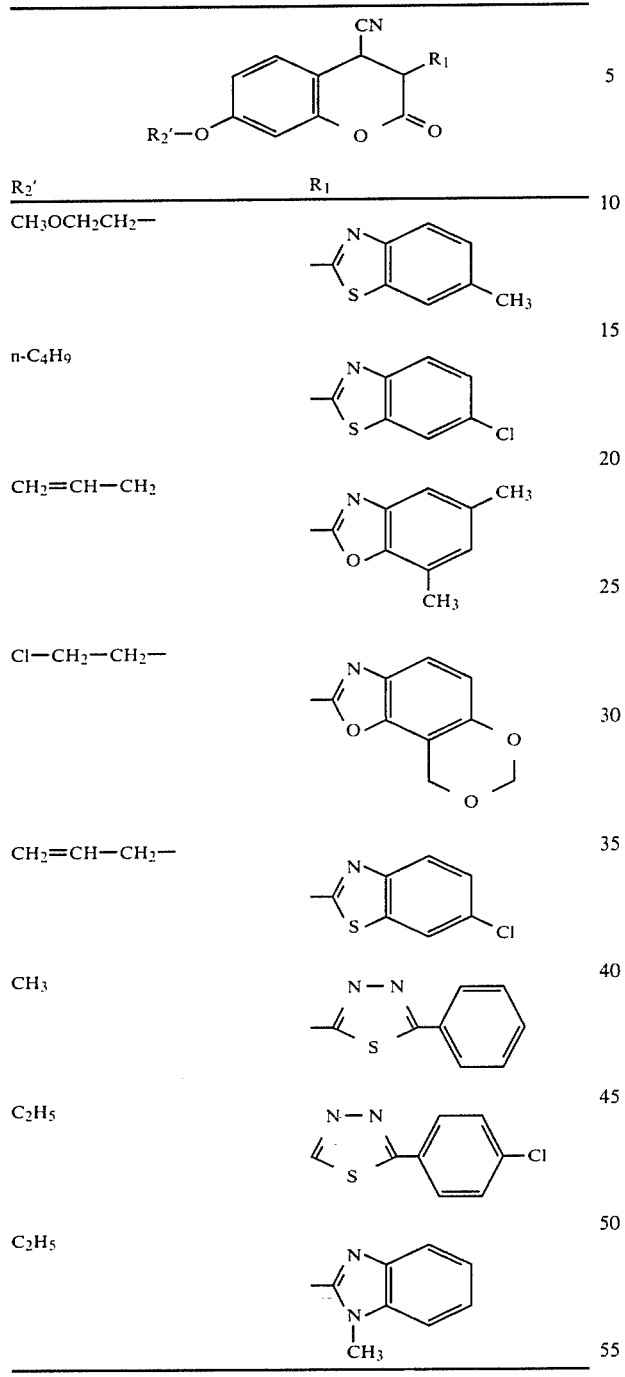

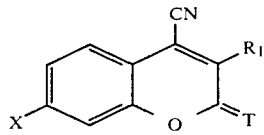

We claim:

1. In a light-collecting system comprising an emission surface and an absorption surface wherein the ratio of the emission surface to the absorption surface is 1:50–2,000, said light-collecting system comprising a medium which has a greater optical density than its surrounding and which has at least one center capable of fluorescence wherein said center contains an energy converter, the improvement wherein said energy converter comprises a coumarin derivative of the formula in which T denotes O, in which
$R_1$ denotes a carbocyclic or heterocyclic 5-membered or 6-membered ring bonded via a C atom, or a 5-membered or 6-membered heterocyclic ring which is bonded via a N atom and is asymmetrical to an axis placed through the coumarin/N-heterocyclic bond, it being possible for the said 5-membered or 6-membered rings to carry non-ionic substituents and for an optionally substituted benzene ring or an optionally substituted naphthalene ring to be fused to the said rings;

X signifies

or $-OR_2'$, in which
$R_2$ represents hydrogen, alkyl, cycloalkyl, aralkyl or aryl, it being possible for the said hydrocarbon radicals to be substituted, and $R_3$, in addition to having the definitions given for $R_2$, also signifies a radical of the formulae $R_6-(X_1)_n-CO-$ or $R_7-(X_1)_n-SO_2-$ in which
$R_6$ and $R_7$ represent alkyl, cycloalkyl, aryl or aralkyl, it being possible for the said hydrocarbon radicals to be substituted,
$X_1$ represents NH or O and
n represents 0 or 1, or
$R_2$ and $R_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto, or $R_2$ and $R_3$ together form a di-unsaturated radical of the formula

in which
$R_8$ represents optionally substituted alkyl, optionally substituted aryl, optionally substituted cycloalkyl or optionally substituted aralkyl, and
$R_2'$ signifies optionally substituted alkyl, alkenyl, optionally substituted cycloalkyl, optionally substituted aryl or optionally substituted aralkyl and a homopolymer or copolymer of acrylic acid or its derivatives or a polycarbonate.

2. A light-collecting system according to claim 1, wherein in the coumarin derivative of the formula (I) $R_1$ represents a pyrazolyl, imidazolyl, thiazolyl, oxasolyl, 1,2,4-triazolyl, 1,3,4-oxadiazolyl, 1,3,4-thiadiazolyl, benzimidazolyl, benzthiazolyl, benzoxazolyl or pyridinyl radical and the said heterocyclic radicals can be substituted.

3. A light-collecting system according to claim 1, wherein in the coumarin derivative of the formula (I)
$R_2$ represents hydrogen and
$R_3$ represents a radical of the formula

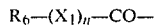

or

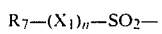

in which
$R_6$ and $R_7$ signify alkyl, cycloalkyl, aryl or aralkyl and the said hydrocarbon radicals can be substituted,
$X_1$ represents NH or O and
n represents 0 or 1.

4. A light-collecting system according to claim 1, wherein in the coumarin derivative of the formula (I),
$R_2$ and $R_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto.

5. Light-collecting system according to claim 1, wherein $R_2'$ represents $C_1$-$C_5$-alkyl, which is optionally substituted by acetoxy, $C_1$-$C_4$-alkoxy, phenoxy, cyclohexyloxy, phenyl-$C_1$-$C_2$-alkoxy, bromine or chlorine, or allyl, cyclohexyl or phenyl-$C_1$-$C_2$-alkyl.

6. A light collecting system according to claim 1, wherein said coumarin derivative has the formula

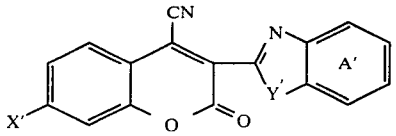

in which
X' is

or —O—$R_2'''$,
in which
$R_2''$ represents hydrogen or $C_1$-$C_4$-alkyl,
$R_3'$ represents $C_1$-$C_4$-alkyl, $C_1$-$C_4$-alkylsulphonyl or phenylsulphonyl and
$R_2'''$ represents $C_1$-$C_4$-alkyl,
Y' signifies O, $NR_5'$ or S and
$R_5'$ signifies $C_1$-$C_4$-alkyl or phenyl, and in which the ring A' can be substituted by $C_1$-$C_4$-alkyl, $C_1$-$C_4$-alkoxy, halogen, $C_1$-$C_4$-alkylsulphonyl or sulphamoyl.

7. A light collecting system according to claim 6, wherein
$R_2''$ is methyl or ethyl,
$R_3'$ is methyl or ethyl,
$R_5'$ is methyl or phenyl, and wherein for the substitution of ring A, the $C_1$-$C_4$-alkyl is methyl, the $C_1$-$C_4$ alkoxy is methoxy, the halogen is chlorine and the $C_1$-$C_4$-alkylsulphonyl is methylsulphonyl or sulphamoyl.

8. A light-collecting system according to claim 1 wherein in a 0.05% strength solution in chloroform, measured in a layer thickness of 10 cm, the coumarin derivative is characterized by exhibiting an increase in the transmission from 0% to >90% for a change in the wavelength of 25 to 100 nm.

9. A light-collecting system according to claim 8, wherein said change in the wavelength is 25 to 45 nm.

10. Light-collecting system, according to claim 1 wherein said compound of the Formula I is in admixture with a homopolymer of acrylic acid or its derivatives.

11. Light-collecting system, according to claim 1 wherein said compound of the Formula I is in admixture with copolymer of acrylic acid or its derivatives.

12. Light-collecting system, according to claim 1 wherein said compound of the Formula I is in admixture with a polycarbonate.

* * * * *

UNITED STATES PATENT AND TRADEMARK OFFICE
CERTIFICATE OF CORRECTION

PATENT NO. : 4,544,496
DATED : October 1, 1985
INVENTOR(S) : Uwe Claussen, et al.

It is certified that error appears in the above-identified patent and that said Letters Patent is hereby corrected as shown below:

| | |
|---|---|
| Col. 2, line 1 | Delete formulas and substitute $--R_6-(X_1)_n-CO-$ or $R_7-(X_1)_n-SO_2-$ -- |
| Col. 3, line 52 | Delete "fuxed" and substitute --fused-- |
| Col. 3, line 65 | Before "$R_8$" delete "and" and substitute --or-- |
| Col. 5, line 47 | Delete "According" and substitute --Accordingly-- |
| Col. 17, line 3 | Delete "oxasolyl" and substitute --oxazolyl-- |

Signed and Sealed this

Twenty-eighth Day of January 1986

[SEAL]

Attest:

DONALD J. QUIGG

Attesting Officer

Commissioner of Patents and Trademarks